United States Patent Office 3,586,700
Patented June 22, 1971

3,586,700
3,4,5-TRITHIATRICYCLO[5.2.1.0²,⁶]DECANES AND DERIVATIVES
Abraham Nathan Kurtz and Theodore Curtis Shields, Charleston, W. Va., assignors to Union Carbide Corporation, New York, N.Y.
No Drawing. Filed Feb. 19, 1969, Ser. No. 800,775
Int. Cl. C07d 77/00; C08g 23/00
U.S. Cl. 260—327
22 Claims

ABSTRACT OF THE DISCLOSURE 3,4,5-trithiapolycyclo compounds are produced by reacting a norbornenyl compound with sulfur using ammonia as catalyst. The reaction is carried out by heating a catalyzed mixture of the norbornenyl compound and sulfur at a temperature above about 85° C. 3,4,5-trithiatricyclo [5.2.1.0²,⁶]decane is produced from bicyclo[2.2.1]hept-2-ene and sulfur. The trithiapolycyclo compounds can be polymerized to sulfur containing polymers or they can be converted to their corresponding dithiols; they are also inhibitors of free radical initiated polymerization of ethylenically unsaturated monomers. The polymers can be used to produce films or as protective coatings.

---

This invention relates to novel 3,4,5-trithiapolycyclo [5.2.1.0²,⁶]decanes and to the 3,4,5-trithiapolycyclo derivatives thereof, and to the methods for their production.

The interaction of sulfur with organic compounds has been known for many years to generally result in complex polysulfide compounds. Consequently, it was a completely unexpected and unobvious finding to discover that the catalytic interaction of sulfur with the hereinafter defined bicyclo[2.2.1]hept-2-ene compounds produces a novel class of 3,4,5-trithiatricyclo[5.2.1.0²,⁶]decane compounds. It was also completely unexpected and unobvious that this catalytic reaction occurs only in the presence of certain highly polar organic solvents. Still more unexpected and unobvious was the finding the sulfuration occurs only across the double bond in the bicyclo[2.2.1]hept-2-ene ring structure.

The catalyst for the direct sulfuration of the bicyclo [2.2.1]hept-2-ene compounds, also known as norbornenes, to the 3,4,5-trithiatricyclo[5.2.1.0²,⁶]decanes is ammonia, though it has also been found that certain organic amines will also catalyze the reaction, e.g. aniline. The ammonia catalyst can be introduced into the reaction mixture either before the sulfuration reaction has been started or during the sulfuration reaction; the manner of addition is not critical. A preferred procedure is to bubble the ammonia in the form of a gas through a mixture of the reactants; one can also bubble the ammonia through a mixture of less than all of the reactants and then add the remaining reactants. The concentration thereof is not critical and can be varied widely, as shown in the examples; the sole requirement is that a catalytically effective amount be present sufficient to permit the production of the 3,4,5-trithiapolycyclo compounds.

The polar organic solvents that are used are those that are liquid at the reaction temperature and can be represented by the general formulas:

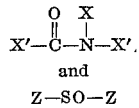

and

Z—SO—Z wherein each X, X′ and X″ taken singly represents hydrogen or lower alkyl up to about four carbon atoms, such as methyl, ethyl, propyl, butyl and the like; X′ taken singly represents hydrogen or lower alkyl of one or two carbon atoms; X′ and X″ when taken jointly represent the divalent propylene group, —CH₂CH₂CH₂—; and Z is a lower alkyl group having one to two carbon atoms. Illustrative of suitable compounds one can mention formamide, N-methylformamide, N,N-dimethylformamide, N-ethylformamide, N,N-diethylformamide, N-propylformamide, N,N-dipropylformamide, N-butylformamide, N,N-dibutylformamide, N-methyl-N-ethylformamide, acetamide, N,N-dimethylacetamide, N-ethylacetamide, N,N-diethylacetamide, propionamide, N,N-dimethylpropionamide, N-methyl-2-pyrrolidinone, N-ethyl-2-pyrrolidinone, N-propyl-2-pyrrolidinone, N-butyl-2-pyrrolidinone, dimethyl sulfoxide, diethyl sulfoxide, and the like. The polar organic solvent can be the only solvent present or it can be used in conjunction with other inert organic solvents. It was observed that the reaction does not proceed when formamide is the sole solvent present and that formamide must be used in conjunction with at least one of the other organic solvents or with one of the co-solvents. When other inert organic solvents are used, the concentration of the polar organic solvent in the mixture of solvents can be as low as one part thereof per one hundred parts of the solvents mixture. Preferred concentrations are from about one to about 25 parts of the polar organic solvent per one hundred parts of the solvents mixture, with concentrations of from one to ten parts more preferred.

The inert organic co-solvents are preferably the basic amines that are free of hydrogen atoms on the amine nitrogen atom and are liquid at the reaction temperature. These include the tertiary amines such as trimethylamine, triethylamine, tripropylamine, tributylamine, N,N-dimethylaniline, N,N-diethylaniline, pyridine, and the like. The preferred basic amine inert organic solvent is pyridine.

In addition, up to about one half of the solvents mixture can be an inert organic hydrocarbon solvent such as toluene, benzene, xylene, ethyl benzene, diethyl benzene, indane, and the like. Any liquid inert organic hydrocarbon solvent can be used.

The temperature of the reaction can be varied from about 85° C. to about 140° C., or higher. It is preferably from about 100° C. to about 120° C.

The amount of sulfur that is added to the reaction mixture can vary from about 1 to about 10 moles or more per mole of bicyclo[2.2.1]hept-2-ene compound charged. Theoretically three moles of sulfur are necessary per mole of bicyclo[2.2.1]hept-2-ene compound in order to produce the corresponding trithiane. The use of from about 2 moles to about 4 moles of sulfur per mole of bicyclo [2.2.1]hept-2-ene compound is preferred. However, larger or smaller amounts can be used if desired.

The bicyclo[2.2.1]hept-2-ene compounds that are suitable for use in this invention can be represented by the general formula:

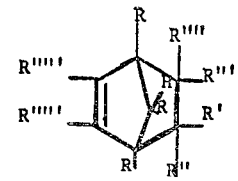

wherein each of R, R′, R″, R‴ and R⁗ when taken singly can be hydrogen; halogen; alkyl of from 1 to about 15 carbon atoms such as methyl, ethyl, propyl, pentyl, octyl, 2-ethylhexyl, nonyl, decyl, dodecyl, pentadecyl, and the like; aryl of from 6 to about 15 carbon atoms such as phenyl, naphthyl, benzyl, phenethyl, alpha mesityl, naphthal, tolyl, xylyl, mesityl, methylnaphthyl, and the like; and cycloalkyl of from 4 to about 10 carbon atoms such as cyclobutyl, cyclopentyl, methylcyclopentyl, dimethylcyclopentyl, ethylcyclopentyl, cyclohexyl, methyl-cyclohexyl, cyclopentyl, and the like; R' and R''' when taken singly can also be alkenyl of from 2 to about 10 carbon atoms such as vinyl, propenyl, allyl, 1-butenyl, 2-butenyl, 3-butenyl, pentenyl, hexenly, 2-ethylhexenly, decenyl, and the like; hydroxyl; hydroxyalkyl containing from 1 to about 10 carbon atoms such as hydroxymethyl, hydroxyethyl, hydroxypropyl, 2-hydroxypropyl, hydroxypentyl, hydroxyoctyl, hydroxydecyl, and the like; haloalkyl containing from 1 to about 10 carbon atoms such as chloromethyl, bromomethyl, fluoromethyl, chlorethyl, chloropropyl, bromobutyl, dichlorobutyl, chlorohexyl, chloroheptyl, fluorononyl, chlorodecyl, and the like; dialkylamino wherein the alkyl group contains from 1 to about 10 carbon atoms such as N,N-dimethyamino, N,N-diethylamino, N,N - dipropylamino, N,N-dibutylamino, N,N-didecylamino and the like; dialkylaminoalkyl wherein the alkyl group contains from 1 to about 4 carbon atoms such as N,N-dimethylaminoethyl, N,N-dipropylaminobutyl, and the like; and alkoxy having from 1 to about 10 carbon atoms such as methoxy, ethoxy, pentoxy, cyclopentoxy, hexoxy, cyclohexoxy, decoxy, and the like; R'''' can be hydrogen or alkyl of from 1 to about 15 carbon atoms, as previously shown; R' and R'' taken together and R''' and R'''' taken together are alkylidene of from 1 to about 6 carbon atoms such as methylene, ethylidene, propylidene, butylidene, pentylidene, hexylidene, and the like; R' and R''' taken together are the divalent

—CHYCH=CY— group in which Y is hydrogen or methyl. It is understood that the substituents on the bicycloheptyl ring can be either linear or branched; these variations are known to those skilled in the art. The preferred bicyclo[2.2.1]hept-2-ene compounds are usually those that have not more than two substituents on the bicyclic moiety and those in which the hydrogen atom on the bridge carbon atom is syn.

Illustrative of suitable norbornene compounds one can mention:

5-chlorobicyclo[2.2.1]hept-2-ene,
5-bromobicyclo[2.2.1]hept-2-ene,
5-fluorobicyclo[2.2.1]hept-2-ene,
5-hydroxybicyclo[2.2.1]hept-2-ene,
5-chloromethylbicyclo[2.2.1]hept-2-ene,
5-bromopropylbicyclo[2.2.1]hept-2-ene,
5-chlorodecylbicyclo[2.2.1]hept-2-ene,
5-methylbicyclo[2.2.1]hept-2-ene,
5-hydroxymethylbicyclo[2.2.1]hept-2-ene,
5-hydroxybutylbicyclo[2.2.1]hept-2-ene,
5-N,N-dimethylaminoethylbicyclo[2.2.1]hept-2-ene,
5-N,N-dipropylaminobutylbicyclo[2.2.1]hept-2-ene,
5,6-dichlorobicyclo[2.2.1]hept-2-ene,
5,6-dihydroxybicyclo[2.2.1]hept-2-ene,
5, N,N-dimethylamino-6-N,N-dimethylaminobicyclo-[2.2.1]hept-2-ene,
5,6-di-(N,N-diethylaminobicyclo[2.2.1]hept-2-ene,
5,6-diethylbicyclo[2.2.1]hept-2-ene,
5,6-di-(chloroethyl)-bicyclo[2.2.1]hept-2-ene,
5,6-di-(bromobutyl)-bicyclo[2.2.1]hept-2-ene,
5,6-di(chlorononyl)-bicyclo[2.2.1]hept-2-ene,
5,6-di-(hydroxypropyl)-bicyclo[2.2.1]hept-2-ene,
bicyclo[2.2.1.]hept-5-en-2-yl ethyl ether,
bicyclo[2.2.1]hept-5-en-2-yl ethyl sulfide,
1-(bicyclo[2.2.1]hept-5-en-2-yl)-1,3-propanediol,
bicyclo[2.2.1]hept-5-en-2-ylmethyl cyclopentyl ether,
bicyclo[2.2.1]hept-5-en-2-ylmethyl cyclohexyl ether,
4-oxatricyclo[5.2.1.0 $^{2,6}$]dec-8-ene,
4-thiatricyclo[5.2.1.0 $^{2,6}$]dec-8-ene,
bicyclo[2.2.1]hept-2-ene,
1-methylbicyclo[2.2.1]hept-2-ene,
5-methylbicyclo[2.2.1]hept-2-ene,
5-methyl-6-chlorobicyclo[2.2.1]hept-2-ene,
1-ethylbicyclo[2.2.1]hept-2-ene,
5-ethylbicyclo[2.2.1]hept-2-ene,
5-isopropylbicyclo[2.2.1]hept-2-ene,
5-pentylbicyclo[2.2.1]hept-2-ene,
5-heptylbicyclo[2.2.1]hept-2-ene,
5-heptyl-6-hydroxybicyclo[2.2.1]hept-2-ene,
5-(2-ethylhexyl)bicyclo[2.2.1]hept-2-ene,
1-nonylbicyclo[2.2.1]hept-2-ene,
5-nonylbicyclo[2.2.1]hept-2-ene,
5-dodecylbicyclo[2.2.1]hept-2-ene,
5-pentadecylbicyclo[2.2.1]hept-2-ene,
5,5-dimethylbicyclo[2.2.1]hept-2-ene,
5,5-diisopropylbicyclo[2.2.1]hept-2-ene,
5,5-dibutylbicyclo[2.2.1]hept-2-ene,
5,5-dihexylbicyclo[2.2.1]hept-2-ene,
5-methyl-5-ethylbicyclo[2.2.1]hept-2-ene,
5,5-didecylbicyclo[2.2.1]hept-2-ene,
5,6-dimethylbicyclo[2.2.1]hept-2-ene,
5-methyl-6-ethylbicyclo[2.2.1]hept-2-ene,
5,6-dipropylbicyclo[2.2.1]hept-2-ene,
5,6-diisopropylbicyclo[2.2.1]hept-2-ene,
5,6-dipentylbicyclo[2.2.1]hept-2-ene,
5,6-di(2-ethylhexyl)bicyclo[2.2.1]hept-2-ene,
5,6-didodecylbicyclo[2.2.1]hept-2-ene,
5,5,6-trimethylbicyclo[2.2.1]hept-2-ene,
5,5,6-tripropylbicyclo[2.2.1]hept-2-ene,
5,5-dimethyl-6-ethylbicyclo[2.2.1]hept-2-ene,
5,5,6,6-tetramethylbicyclo[2.2.1]hept-2-ene,
5,5,6,6-tetraisopropylbicyclo[2.2.1]hept-2-ene,
5,5-dimethyl-6,6-diethylbicyclo[2.2.1]hept-2-ene,
1-phenylbicyclo[2.2.1]hept-2-ene,
5-phenylbicyclo[2.2.1]hept-2-ene,
5-naphthylbicyclo[2.2.1]hept-2-ene,
5,5-diphenylbicyclo[2.2.1]hept-2-ene,
5,6-diphenylbicyclo[2.2.1]hept-2-ene,
5-benzylbicyclo[2.2.1]hept-2-ene,
5-phenethylbicyclo[2.2.1]hept-2-ene,
5,6-dibenzylbicyclo[2.2.1]hept-2-ene,
5-α-mesitylbicyclo[2.2.1]hept-2-ene,
5-tolylbicyclo[2.2.1]hept-2-ene,
5,6-ditolylbicyclo[2.2.1]hept-2-ene,
5-xylylbicyclo[2.2.1]hept-2-ene,
5-methylnaphthylbicyclo[2.2.1]hept-2-ene,
5-cyclobutylbicyclo[2.2.1]hept-2-ene,
5,6-dicyclopentylbicyclo[2.2.1]hept-2-ene,
5-methylcyclopentylbicyclo[2.2.1]hept-2-ene,
5-isopropylcyclopentylbicyclo[2.2.1]hept-2-ene,
5-cyclohexylbicyclo[2.2.1]hept-2-ene,
5-methylenebicyclo[2.2.1]hept-2-ene,
5-ethylidenebicyclo[2.2.1]hept-2-ene,
5-propylidenebicyclo[2.2.1]hept-2-ene,
5-butylidenebicyclo[2.2.1]hept-2-ene,
5-hexylidenebicyclo[2.2.1]hept-2-ene,
5,6-dimethylenebicyclo[2.2.1]hept-2-ene,
5,6-diethylidenebicyclo[2.2.1]hept-2-ene,
5-methyl-6-ethylidenebicyclo[2.2.1]hept-2-ene,
5-chloro-6-ethylidenebicyclo[2.2.1]hept-2-ene,
5-hydroxymethyl-6-methylenebicyclo[2.2.1]hept-2-ene,
5-chloromethyl-6-methylenebicyclo[2.2.1]hept-2-ene,
5-vinylbicyclo[2.2.1]hept-2-ene,
5-allylbicyclo[2.2.1]hept-2-ene,
5-(3-butenyl)bicyclo[2.2.1]hept-2-ene,
5-(4-pentenyl)bicyclo[2.2.1]hept-2-ene,
5-(2-methylbut-3-enyl)bicyclo[2.2.1]hept-2-ene,
5-(5-hexenyl)bicyclo[2.2.1]hept-2-ene,
5-propenylbicyclo[2.2.1]hept-2-ene,
5-isopropenylbicyclo[2.2.1]hept-2-ene,
5-allyl-5-methylbicyclo[2.2.1]hept-2-ene,
5-propenyl-6-methylbicyclo[2.2.1]hept-2-ene,
5-methylene-6-methylbicyclo[2.2.1]hept-2-ene,
5-methylene-6-propylbicyclo[2.2.1]hept-2-ene,
5-vinyl-6-ethylbicyclo[2.2.1]hept-2-ene,
5-(5-hexenyl)-6-methylbicyclo[2.2.1]hept-2-ene, and the like.

The 3,4,5-trithiapolycyclo compounds that are produced by the process of this invention are represented by the general formula:

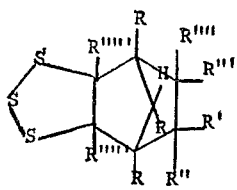

It was found that the exo-form of these compounds is produced by this invention. Illustrative of compounds falling within the immediately preceding formula one can mention:

exo-3,4,5-trithiatricyclo[5.2.1.0$^{2,6}$]decane,
exo-3,4,5-trithiatetracyclo[5.5.1.0$^{2,6}$.0$^{8,12}$]tridec-9-ene,
8-vinyl-exo-3,4,5-trithiatricyclo[5.2.1.0$^{2,6}$]decane,
8-ethylidene-exo-3,4,5-trithiatricyclo[5.2.1.0$^{2,6}$]decane,
8-methyl-exo-3,4,5-trithiatricyclo[5.2.1.0$^{2,6}$]decane,
8,9-dimethyl-exo-3,4,5-trithiatricyclo[5.2.1.0$^{2,6}$]decane,
8-chloro-exo-3,4,5-trithiatricyclo[5.2.1.0$^{2,6}$]decane,
8,9-dichloro-exo-3,4,5-trithiatricyclo[5.2.1.0$^{2,6}$]decane,
8-hydroxy-exo-3,4,5-trithiatricyclo[5.2.1.0$^{2,6}$]decane,
8,9-dihydroxy-exo-3,4,5-trithiatricyclo[5.2.1.0$^{2,6}$]decane,
exo-3,4,5-trithiatricyclo[5.2.1.0$^{2,6}$]decan-exo-8-methanol,
exo-3,4,5-trithiatricyclo[5.2.1.0$^{2,6}$]decan-endo-8-methanol,
8,9-dihydroxymethyl-exo-3,4,5-trithiatricyclo-
[5.2.1.0$^{2,6}$]decane,
8-chlorodecyl-exo-3,4,5-trithiatricyclo[5.2.1.0$^{2,6}$]decane,
8,9-di-(aminomethyl)-exo-3,4,5-trithiatricyclo-
[5.2.1.0$^{2,6}$]decane,
1-nonyl-exo-3,4,5-trithiatricyclo[5.2.1.0$^{2,6}$]decane,
8-methyl-8-ethyl-exo-3,4,5-trithiatricyclo-
[5.2.1.0$^{2,6}$]decane,
8,8,9,9-tetramethyl-exo-3,4,5-trithiatricyclo-
[5.2.1.0$^{2,6}$]decane,
8-phenyl-exo-3,4,5-trithiatricyclo[5.2.1.0$^{2,6}$]decane,
8-cyclopentyl-exo-3,4,5-trithiatricyclo[5.2.1.0$^{2,6}$]decane,
8-(3-butenyl)-exo-3,4,5-trithiatricyclo[5.2.1.0$^{2,6}$]decane,
8-chloro-9-ethylidene-exo-3,4,5-trithiatricyclo-
[5.2.1.0$^{2,6}$]decane,
8-chloromethyl-9-methylene-exo-3,4,5-trithiatricyclo-
[5.2.1.0$^{2,6}$]decane,
8-(5-hexenyl)-9-methyl-exo-3,4,5-trithiatricyclo-
[5.2.1.0$^{2,6}$]decane, and the like.

The catalytic sulfuration process of the instant invention appears to be quite specific to the bicyclo[2.2.1]hept-2-ene compounds defined herein. The same process was used to sulfurate other unsaturated products in attempts to produce the corresponding cyclic trithia compounds but without success. These results were completely unexpected. Even more unexpected was that the process did not work with norbornadiene. This is shown in the following experiments. In these experiments about 0.2 mole of the specified unsaturated compound was reacted for 3 to 6 hours at 110° C. to 120° C. In the reaction the compound was added to a mixture of 100 ml. of N,N-dimethylformamide and 9.6 grams of sulfur flowers that had previously been treated with about 1.2 grams of ammonia and the mixture was then heated with stirring for the time stated. The results are tabulated below:

| Starting unsaturated materials: | Code |
|---|---|
| Cyclopentadiene at 25° C. | (a) |
| Bicyclo[2.2.1]hept-2,5-diene | (d) |
| Bicyclo[2.2.1]hepta-2,5-diene (at 95° with no ammonia | (a) |
| Tetrachloroethylene | (a) |
| Cycloocta-1,3-diene | (a) |
| Cyclohexa-1,3-diene | (b) |
| 2,6-di-t-butylphenol | (a) |
| 1,2-bicyclo[2.2.1]hepta-2,5-diene dimer | (d) |
| 1,2-diethylidenecyclobutane | (b) |
| 2-phenylbicyclo[2.2.1]hept-2-ene | (a) |
| 1,4,5,6,7,7-hexachlorobicyclo[2.2.1]hept-5-en-2,3-dimethanol | (a) |
| Acrylonitrile | (c) |
| 2,6-di-t-butylphenol [1] | (e) |
| Caprolactone | (a) |
| Bicyclo[2.2.1]hept-5-ene-2,3-dicarboxylic anhydride | (b) |
| Mesityl oxide | (b) |
| $F_2C{=}CF_2$ (bubbled into mixture) | (a) |
| Indene | (a) |
| Indene [1] | (b) |
| 4-phenylbut-3-en-2-one | (b) |
| Cyclohexene | [3](a) |
| 2,5-dihydrofurane | [3](a) |
| 4-ethyloct-1-yn-3-ol | [4](b) |
| 3,4-dihydropyrane | [4](a) |
| Alpha-methylstyrene | [4](b) |
| Cyclopentene | [2](a) |
| 1,2-diethylidenecyclobutane | [2](b) |
| 1-ethyl-2-ethylidenecyclobutane | [2](c) |
| 1,2-diethylcyclobutene | [2](c) |
| 1,5-cyclooctadiene | [2](a) |

[1] Reaction performed with sodium methoxide present.
[2] Employed 9.6 grams of the olefin and 6.4 grams of sulfur flowers in 100 ml. of dimethylformamide. Ammonia was bubbled into the mixture for five minutes and the reaction was carried out at 110° C. to 115° C. for 5 to 6 hours.
[3] Employed 10 grams of the olefin and 6 grams of sulfur flowers in 100 ml. of dimethylformamide. Ammonia was bubbled into the mixture at 30° C. until it was almost black. The mixture was stirred at 110° C. for about 4 hours.
[4] Employed 10 grams of the olefin and 6 grams of sulfur flowers in 85 ml. of dimethylformamide. The ammonia was bubbled through the mixture of sulfur flowers and dimethylformamide. The reaction time was four hours at 110° C.

NOTE (a) No reaction detected.
(b) Many products in small or trace yields but no cyclic trithiane detected.
(c) Disappearance of starting material with no cyclic trithiane products detected.
(d) Polymerized to tars or gums.
(e) Oxidatively dimerized; no cyclic trithiane detected.

The trithiapolycyclic compounds produced herein can be used to produce sulfur containing polymers containing the repeating unit of the average formula:

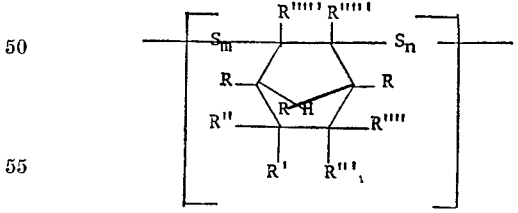

in the polymer chain, wherein $$\frac{m+n}{2}$$

has a value of 3. The polymers are generally solids with average molecular weights ranging up to about 1,000 or more. The polymers can be used as additives for lubricants and can also be used to produce protective coatings on solid substrates or to produce fibers and films.

The polymers can be produced by heating the monomers at elevated temperatures for long periods while distilling low boiling materials. Subatmospheric, atmospheric or superatmospheric pressure can be used; this is a matter of choice and is not critical. The temperature can vary from about 100° C. at atmospheric or higher pressure to about 250° C. or higher. When a subatmospheric pressure is employed a temperature of from about 125° C. to about 250° C. is preferred. The preferred temperature under all pressure conditions is from about 125° C. to about 200° C. Any temperature can be used that will cause the polymerization reaction to occur without causing undue decomposition. The compounds can be polymerized alone or in admixture, or copolymerized with other known polymerizable monomers.

The polymerization can be carried out in the absence of a catalyst, solely by heating the monomers to a polymerization-inducing temperature and permitting the mixture to stand, or in the presence of catalysts. A suitable catalyst is antimony pentachloride.

In addition to their use in the production of polymers the trithiapolycyclic compounds can also be used to produce the corresponding dithiols of the formula:

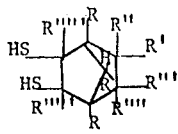

which can be used as rubber accelerators. The trithiapolycyclic compounds are useful in themselves as inhibitors to stabilize and retard the polymerization of polymerizable ethylenically unsaturated compounds.

It was found that the trithiapolycyclo compounds of this invention inhibited the free radical polymerization of vinyl chloride/vinyl acetate mixtures. A concentration of 0.07 percent of exo-3,4,5-trithiatricyclo[5.2.1.0$^{2,6}$]decane resulted in a reduction of 80 percent in the polymerization of a 75/25 mixture of said monomers using diacetyl peroxide as the catalyst.

The following examples further serve to illustrate the invention.

EXAMPLE 1

Sulfur flowers (240 g., 7.5 moles) was introduced into a five liter, three necked round bottom Pyrex flask equipped with a reflux condenser, a nitrogen purge, and a mechanical stirring device. Dimethylformamide (3,500 g.) was added and the mixture was stirred while heating to 40° C. After stirring for 30 minutes, the mixture was permitted to cool to 30° C. and bicyclo[2.2.1]hept-2-ene (418 g., 4.43 moles was added. Ammonia (6 g., 0.143 mole) was bubbled slowly into the mixture through a dip tube while stirring and the mixture darkened and was almost black after 30 minutes. The temperature was then raised to 110° C. over a period of 30 minutes and it was maintained at 110° C. for 110 minutes longer and then cooled. The solvent was removed below 50° C. under vacuum (0.3 mm.). The concentrate was extracted using a 2:1 ether:carbon disulfide mixture, washed with water until free of dimethylformamide and filtered. After removal of the ether and carbon disulfide, a vacuum distillation afforded 409.7 g. (2.155 moles of exo-3,4,5-trithiatricyclo[5.2.1.0$^{2,6}$]decane in 86.3% yield (based on sulfur).

Analysis.—Calc'd for $C_7H_{10}S_3$ (percent): C, 44.16; H, 5.29; S, 50.53. Found (percent): C, 44.50; H, 5.38; S, 48.67.

EXAMPLE 2

Sulfur flowers (6.4 g., 0.2 mole) was introduced into 1-methyl-2-pyrrolidinone (100 ml.) held in a 250 ml., two neck, round bottom flask previously purged with nitrogen and equipped with a reflux condenser and magnetic stirrer. After adding bicyclo[2.2.1]hept-2-ene (9.4 g., 0.1 mole) a dip tube was introduced into the mixture and ammonia bubbled in for about nine minutes. The mixture was heated to 105° C. over a 15 minute period and maintained at 105° C. for 105 minutes. After extraction of the reaction product with ether, and water washing to remove the solvent, vacuum fractional distillation afforded 10.24 g. of a mixture of compounds which upon nuclear magnetic resonance analysis was shown to consist of 4.75 g. (0.025 mole) of exo-3,4,5-trithiatricyclo[5.2.1.0$^{2,6}$] decane and 5.54 g. (0.025 mole) of bis-2-bicyclo[2.2.1] heptyl sulfide.

EXAMPLE 3

Bicyclo[2.2.1]hept-2-ene (122 g., 1.3 moles) was introduced into a 2 liter round bottom, three neck flask containing 800 ml. of triethylamine, 32 grams of sulfur and 200 ml. of dimethylformamide that was equipped with a mechanical stirrer, nitrogen purge, and reflux condenser. Ammonia (13 g., 0.765 mole) was then bubbled into the mixture for 25 minutes and it was heated to 90° C. (reflux) over a period of 45 minutes. Sulfur flowers (5 g.) was added and the mixture was stirred for 90 minutes after which another 5 grams of sulfur was added. After stirring another 60 minutes, 22 g. (total added, 1 mole) of sulfur was introduced and the mixture was stirred an additional ten hours at 90° C. Upon fractional distillation there was recovered 23.3 g. of (N,N-diethyl(thioacetamide (B.P. 102–105° C./4.5 mm.) and 126.9 g. of a mixture of exo-3,4,5-trithiatricyclo[5.2.1.0$^{2,6}$]decane and bis-2-bicyclo[2.2.1]heptyl sulfide. Gas-liquid chromatographic analysis of the mixture showed that the two were present in a ratio of 11:9, respectively.

EXAMPLE 4

Bicyclo[2.2.1]hept-2-ene (374 g., 4 moles) and sulfur flowers (256 g., 8 moles) were introduced into a 5 liter three necked, round bottom flask containing 2,850 ml. of pyridine and 150 ml. of dimethyl formamide. The flask was equipped with a reflux condenser, nitrogen purge, and mechanical stirrer. Ammonia (37 g., 2.18 moles) was bubbled into the slurry at 25–50° C. for a period of 70 minutes. The mixture was then heated to a temperature of 107° C. over a period of 25 minutes after which 32 g. (1 mole) more sulfur was introduced. The reaction temperature of 105–7° C. was maintained for another 200 minutes before cooling. Pyridine and unreacted bicyclo-[2.2.1]hept-2-ene (total, 2,946 g.) were removed by vacuum distillation and the product concentrate was mixed with ether and permitted to stand overnight. Sulfur (14.5 g., 0.453 mole) was removed by filtration and the ether solution was water washed and dried over sodium sulfate. After removal of ether under vacuum, fractional distillation afforded 409.4 g. of the pure exo-3,4,5-trithiatricyclo[5.2.1.0$^{2,6}$]decane B.P. 113–5° C./0.5 mm. Yield based on sulfur was 81.9%.

EXAMPLE 5

Sulfur flowers (3.2 g., 0.1 mole), bicyclo[2.2.1]hept-2-ene (4.4 g., 0.047 mole) and dimethylformamide (10 ml.) were introduced into a carius tube. Trimethylamine (70 ml.) was distilled into the tube and the mixture was permitted to dissolve ammonia (0.75 g., 0.044 mole) bubbled in at −80° C. After sealing, the tube was placed in a rocking enclosure and held at 120° C. for 160 minutes. The tube was cooled and broken and the trimethylamine distilled. The product concentrate was extracted with ether and water washed to remove dimethylformamide leaving a total of 5.81 g. of product. Gas-liquid chromatographic analysis revealed the presence of 4.46 g. exo-3,4,5-trithiatricyclo[5.2.1.0$^{2,6}$]decane and 1.34 g. bis-2-bicyclo[2.2.1] heptyl sulfide in yields based on sulfur of 70.5% and 6.03%, respectively.

EXAMPLE 6

Sulfur flowers (6.4 g., 0.2 mole) and bicyclo[2.2.1]-hept-2-ene (9.4 g., 0.1 mole) were introduced into a 250 ml. round bottom flask, previously purged with nitrogen and equipped with a reflux condenser and magnetic stirrer and containing 80 ml. of N,N-dimethylaniline and 20 ml. of dimethylformamide. After bubbling ammonia into the mixture for seven minutes it was heated to 120° C. and maintained at 120–125° C. for 165 minutes. Fractional distillation afforded 8.45 g. of exo-3,4,5-trithiatricyclo-[5.2.1.0$^{2,6}$]decane, 67% yield.

EXAMPLE 7

Bicyclo[2.2.1]hept-2-ene (9.4 g., 0.1 mole) was reacted with a solution of 9.6 g. (0.3 mole) of sulfur flowers previously treated with ammonia for 6 minutes in 100 ml. of a solution consisting of 1% by volume formamide, 49% pyridine and 50% toluene. The reaction was performed at 109° C. for 145 minutes. Extraction followed by fractional distillation yielded 11.4 g. of exo-3,4,5-trithiatricyclo[5.2.1.0$^{2,6}$]decane.

EXAMPLE 8

Using the same experimental procedure as that used in Example 7, bicyclo[2.2.1]hept-2-ene (18.8 g., 0.2 mole) was reacted with sulfur flowers (9.6 g., 0.3 mole) activated by ammonia in 100 ml. of a solvent mixture of 1 part formamide, 60 parts pyridine and 35 parts toluene for 210 minutes at 106° C. Product workup in the same manner resulted in isolation of 15.6 g. of exo-3,4,5-trithiatricyclo[5.2.1.0$^{2,6}$]decane.

EXAMPLE 9

Sulfur flowers (248 g., 7.75 moles) was introduced into a 5 liter three necked, round bottom Pyrex flask equipped with a reflux condenser, nitrogen purge, and a mechanical stirring device. Dimethyl formamide (3.5 kg.), was added and the mixture was stirred while heating to 115° C. After stirring 20 minutes, the mixture was permitted to cool to 56° C. and 5-vinylbicyclo[2.2.1]hept-2-ene (424 g., 3.5 moles) was added. Ammonia (14 g., 0.825 mole) was bubbled slowly into the mixture through a dip tube while stirring continued. The mixture darkened and was almost black after 30 minutes. The temperature was then increased to 110° C. and maintained for 20 minutes. After removal of most of the dimethylformamide by vacuum distillation, the crude product was quenched with ice water and extracted with ether. Removal of the ether followed by fractional distillation at 126° C. and 0.2 mm. pressure afforded 156.7 g. (0.727 mole) of 8-vinyl-exo-3,4,5-trithiatricyclo[5.2.1.0$^{2,6}$]decane in 28% yield.

*Analysis.*—Calc'd for $C_9H_{12}S_3$ (percent): C, 49.96; H, 5.59; S, 44.45. Found (percent): C, 50.26; H, 5.78; S, 42.83.

EXAMPLE 10

In a manner similar to that described in Example 9, 122 g. of 5-ethylidenebicyclo[2.2.1]hept-2-ene was reacted with 64 g. of sulfur in 3.5 kg. of dimethylformamide and 16 g. of ammonia. The resulting reaction product was extracted with ether, washed with ice water to remove the dimethylformamide and then fractionally distilled. There was recovered 95.5 g. of 8-ethylidene-exo-3,4,5-trithiatricyclo[5.2.1.0$^{2,6}$]decane boiling at 138° C. and 1.8 mm. of mercury pressure, yield was 66.5%.

*Analysis.*—Calc'd for $C_9H_{12}S_3$ (percent): C, 49.96; H, 5.59; S, 44.45. Found (percent): C, 50.24; H, 5.80; S, 42.21.

EXAMPLE 11

In a manner similar to that described in Example 4, 5-methylbicyclo[2.2.1]hept-2-ene (324 g., 3 moles), sulfur flowers (192 g., 6 moles), ammonia (19 g., 1.12 moles) and 3,000 ml. of a 95:5 volume ratio of pyridine:dimethylformamide were reacted for a period of 240 minutes at 107° C. to produce 272.2 g. of 8-methyl-exo-3,4,5-trithiatricyclo[5.2.1.0$^{2,6}$]decane.

*Analysis.*—Calc'd for $C_8H_{12}S_3$ (percent): C, 47.01; H, 5.92; S, 47.07. Found (percent): C, 46.92; H, 5.81; S, 48.28.

EXAMPLE 12

Redistilled endo-dicyclopentadiene (396 g., 3 moles) and sulfur flowers (192 g., 6 moles) were introduced into a 5 liter three-necked, round-bottom flask containing 2,850 ml. of pyridine and 150 ml. of dimethylformamide. The flask was equipped with a reflux condenser, nitrogen purge, and a mechanical stirrer. Ammonia (23 g., 1.35 moles) was bubbled into the slurry at 30° C. for a 20 minute period. The mixture was then raised to a temperature of 108–118° C. and maintained at that range for 280 minutes longer before cooling. Pyridine and excess bicyclo[2.2.1]hept-2-ene were removed by vacuum distillation and the product concentrate was mixed with ether and permitted to stand overnight. The ether was removed under vacuum, yielding a crystalline mass. Recrystallization from sio-octane furnished 161.4 g. of exo-3,4,5-trithiatetracyclo [5.5.1.0$^{2,6}$.0$^{8,12}$]-tridec-9-ene M.P. 71–72°.

*Analysis.*—Calc'd for $C_{10}H_{12}S_3$ (percent): C, 52.58; H, 5.30; S, 42.12. Found (percent): C, 52.53; H, 5.27; S, 41.42.

EXAMPLE 13

A mixture of 16.4 g. consisting of 63% 5-chlorobicyclo[2.2.1]hept-2-ene and 37% 3-chlorotricyclo[2.2.1.0$^{2,6}$]heptane and sulfur flowers (9.6 g., 0.3 mole) was introduced into a 250 ml. round-bottom, three-neck flask containing 120 ml. dimethylformamide; the flask was equipped with a nitrogen purge, mechanical stirrer and a reflux condenser. Ammonia gas (1.71 g., 0.1 mole) was bubbled in at 30° C. for 15 minutes. The mixture was heat to 110° C. and heating continued for another 135 minutes. After cooling, water washing, ether extraction and drying, vacuum distillation rendered 4.3 g. (0.0334 mole) of the starting 3-chlorotricyclo[2.2.1.0$^{2,6}$]heptane compound. The concentrate was diluted with ether and treated with activated carbon. After removal of ether under vacuum the product was left standing for several days and 12.1 g. of yellow crystals, M.P. 53–54° C., which were shown by infrared analysis to be 8-chloro-exo-3,4,5-trithiatricyclo[5.2.1.0$^{2,6}$]decane, were recovered.

*Analysis.*—Calc'd for $C_7H_9S_3Cl$ (percent): C, 37.40; H, 4.04; S, 15.77; Cl, 42.79. Found (percent): C, 37.62; H, 3.77; S, 15.65; Cl, 42.52.

EXAMPLE 14

Two hundred milliliters of dimethylformamide and 19.2 grams of sulfur flowers were charged to a reaction flask and 1.9 grams of ammonia was bubbled through at 25–30° C. After heating the mixture to 55° C., 24.8 grams of bicyclo[2.2.1]-hept-5-en-2-ol was added and then the temperature was raised to 110° C. and the reaction was continued at that temperature for 2.5 hours. A minor amount of exo-3,4,5-trithiatricyclo[5.2.1.0$^{2,6}$]decan-8-ol was produced.

EXAMPLE 15

Bicyclo[2.2.1]hept-5-en-2-methanol (154 g., 1.24 moles) was introduced into a 2 liter three-necked, round-bottom Pyrex flask equipped with a reflux condenser, mechanical stirring device and nitrogen purge. The flask contained 96 g. (3 moles) of sulfur flowers in 1,000 ml. of a 5% dimethylformamide solution in pyridine. Ammonia (17 g., 1 mole) was bubbled through the mixture with stirring at room temperature for 25 minutes. The temperature was then increased to 117° C. and maintained for 180 minutes. After quenching with ice water and extracting with ether, 40 g. of sulfur was removed. The product was dried, treated with carbon black, and fractionally distilled to remove 64.4 grams of unreacted bicyclo[2.2.1]hept-5-en-2-methanol and ether leaving 94.6 g. of a pale yellow viscous oil. Attempts at vacuum distillation were unsuccessful, some decomposition being noted. Therefore, the product was dissolved in ether, purified by treatment with activated carbon black and filtered. The ether was removed by vacuum distillation. The purified oil was a mixture of about equal parts of exo - 3,4,5-trithiatricyclo[5.2.1.0$^{2,6}$]decan-exo-8-methanol and exo-3,4,5 - trithiatricyclo[5.2.1.0$^{2,6}$]decan - endo - 8-methanol. The isomers can be separated by a difficult high vacuum fractional distillation.

*Analysis.*—Calc'd. for $C_8H_{12}S_3O$ (percent): C, 43.60; H, 5.49; S, 43.65. Found (percent): C, 42.01; H, 5.15; S, 46.35.

EXAMPLE 16

A mixture of 6.4 grams of sulfur flowers, 95 ml. of dimethyl sulfoxide and 5 ml. of dimethylformamide was treated at 30° C. by bubbling 2.9 grams of ammonia through it. Then 9.4 grams of bicyclo[2.2.1]hept-2-ene was added and the mixture was stirred at 150° C. for two hours. The reaction mixture was quenched in ice water, the organic layer was separated, washed with water and extracted with ether. Fractional vacuum distillation yielded 4.15 grams of exo-3,4,5-trithiatricyclo[5.2.1.0$^{2,6}$]decane.

EXAMPLE 17

A polymer containing repeating units of the average structure

was prepared by distilling 367 g. of exo-3,4,5-trithiatricyclo[5.2.1.0$^{2,6}$]decane at about 140° C. and a pressure of 0.2 mm. to 0.5 mm. of mercury over a period of about six hours. The distillate was then allowed to stand at room temperature for 7 days. The material was completely dissolved in carbon disulfide and upon addition of ether with vigorous stirring a solid fraction precipitated. The fractional precipitation process was repeated twice more and the gummy, pale yellow solid was ether washed. Kneading of the gum manually changed its consistency to a pale yellow powder which weighed 123.8 g. Subsequent analysis showed this material to be the polymer having an average molecular weight of 922 and the value of $$\frac{m+n}{2}$$

is 3. Polymerization appears to be a result of overheating during the distillation since distillations at lower temperature showed no detectable signs of polymer on standing.

*Analysis.*—Calc'd. for $C_7H_{10}S_3$ (percent): C, 44.17; H, 5.30; S, 50.53. Found (percent): C, 45.10; H, 5.43; S, 47.48.

The polymer can be pressed to produce a film. A solvent solution thereof is useful for protective coating purposes.

EXAMPLE 18

Ammonia (265 g.) was distilled into a two liter, round bottom, three necked flask equipped with a mechanical stirrer, nitrogen purge, and a total reflux condenser. Exo-3,4,5-Trithiatricyclo-[5.2.1.0$^{2,6}$]decane (18 g., 0.095 mole) was mixed with 30 ml. of ether and over a period of 50 minutes sodium (8.4 g., 0.365 mole) was added to the flask in small chips, alternating with small amounts of the ether mixture. After the last portion of the trithiane-ether solution was added, the ammonia, still blue with unreacted sodium, was neutralized with ammonium chloride. One liter of water was slowly added to the mixture. Four liters of ice water were then added to two four liter breakers containing the mixture, and the ammonia was slowly neutralized with concentrated hydrochloric acid to a pH of 6. The solution was extracted with ether. Solvent removal followed by vacuum distillation afforded 10.49 g. (0.0655 mole) of bicyclo[2.2.1]-heptan-exo-2,3-dithiol in 69.0% yield.

*Analysis.*—Calc'd. for $C_7H_{12}S_2$ (percent): C, 52.71; H, 7.87; S, 40.13. Found (percent): C, 51.23; H, 7.26; S, 38.21.

EXAMPLE 19

Exo-3,4,5-Trithiatricyclo[5.2.1.0$^{2,6}$]decane (190 g., 1 mole) was introduced into a 1 liter rocking bomb containing 400 ml. of the monomethyl ether of ethylene glycol and 5 g. (0.0084 mole) of rhenium heptasulfide. Hydrogen pressure was slowly increased while heating the reaction until a pressure of 2,650 lb. at 170° C. was reached; rocking was continued for 210 minutes while heating was slowly continued to 230° C. The mixture was permitted to cool overnight and filtered. Fractional distillation afforded 124.6 g. of mixed products including norbornane and very high boiling cuts. This mixture yielded 95.5 g. of bicyclo[2.2.1]hepta-exo-2,3-dithiol.

EXAMPLE 20

Bicyclo[2.2.1]hepta-2,3-dithiol (8 g., 0.05 mole) was introduced into a pressure bottle containing 100 ml. of acetone and 0.5 ml. of triethylamine. Methyl isocyanate (6.1 g., 0.0107 mole) was added and the bottle sealed. After standing for 30 hours the acetone was removed under vacuum. Recrystallization from iso-octane resulted in isolation of 12.24 g. of 2,3-bis(exo-methylcarbamthioyl)bicyclo[2.2.1]heptane, M.P. 185–86° C.

*Analysis.*—Calc'd. for $C_{11}H_{18}S_2N_2O_2$ (percent): C, 48.14; H, 6.61; S, 23.37; N, 10.21. Found (percent): C, 48.07; H, 6.71; S, 23.23; N, 10.17.

EXAMPLE 21

Sodium metal (4.7 g., 0.204 mole) was dissolved in 100 ml. of absolute ethanol contained in a 250 ml. three-necked, round-bottom Pyrex flask that was equipped with a mechanical stirring device, a nitrogen purge, and a reflux condenser. Bicyclo[2.2.1]hepta-2,3-dithiol (16 g., 0.1 mole) was then introduced. Diethylchlorothiophosphate in 150 ml. ethanol (38 g., 0.258 mole) was then added to the resultant solution dropwise over a period of 50 minutes, during the reaction sodium chloride precipitated. The temperature was kept at about 15° C., stirred overnight and filtered. The ethanol was removed under vacuum and the concentrate extracted with ether, washed with dilute sodium bicarbonate, dried over sodium sulfate, and the ether removed under vacuum. 2,3-bis(exo-O,O-diethylphosphorodithioyl)bicyclo[2.2.1]heptane (34.1 g.) was isolated as a non-distillable, impure oil that was not further purified.

EXAMPLE 22

There were charged to a reaction vessel 14.4 grams of sulfur flowers and 250 ml. of dimethylformamide. The mixture was stirred at 30° C. and 2.7 grams of ammonia was bubbled in. After adding 16 grams of 2-methylbicyclo-[2.2.1]hept-2-ene, it was heated to 105° C. and stirred for 4 hours. The reaction mixture was poured into ice and water; the organic layer was extracted with ether, water washed, dried and fractionally distilled. There was recovered 4.81 grams of endo-2-methyl-exo-3,4,5-trithiatricyclo[5.2.1.0$^{2,6}$]decane after recrystallization.

*Analysis.*—Calc'd. for $C_8H_{12}S_3$ (percent): C, 47.01; H, 5.92; S, 47.07. Found (percent): C, 47.28; H, 6.02; S, 46.12.

It was further observed that dimethylsulfoxide must also be used in conjunction with at least one of the other polar organic solvents and that the concentration of said other polar organic solvent in said mixture can be as low as five parts per hundred parts of the mixture.

What is claimed is:

1. A method for producing 3,4,5-trithiapolycyclo compounds of the formula:

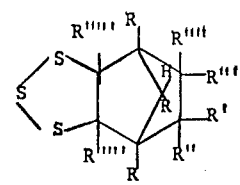

wherein each of R, R′, R″, R‴ and R⁗ when taken singly is hydrogen, halogen, alkyl of from 1 to about 15 carbon atoms, aryl of from 6 to about 15 carbon atoms, and cycloalkyl of from 4 to about 10 carbon atoms; R′ and R‴ when taken singly can further be alkenyl of from 2 to about 10 carbon atoms, hydroxyl, hydroxyalkyl having from 1 to about 10 carbon atoms, haloalkyl having from 1 to about 10 carbon atoms, dialkylamino having from 1 to about 10 carbon atoms, dialkylaminoalkyl wherein the alkyl groups have from 1 to about 4 carbon atoms, and alkoxy having from 1 to about 10 carbon atoms; R″″″ is hydrogen and alkyl of from 1 to about 15 carbon atoms; R′ and R″ taken together and R‴ and R″″ taken together are alkylidene of from 1 to about 6 carbon atoms; R′ and R‴ taken together are the divalent —CHYCH=CY— group; and Y is hydrogen or methyl; which comprises reacting sulfur and a norbornene compound of the formula

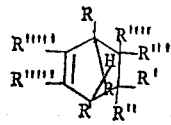

at a temperature of from about 85° C. to about 140° C. in contact with ammonia as catalyst and a polar organic solvent of the group:

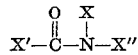

and

wherein each X, X′ and X″ when taken singly is hydrogen, and lower alkyl of from 1 to about 4 carbon atoms; X″ taken singly is hydrogen and lower alkyl of 1 to about 2 carbon atoms; X′ and X″ when taken together are the divalent —CH$_2$CH$_2$CH$_2$— group; and Z is lower alkyl of 1 to about 2 carbon atoms.

2. The method of claim 1 wherein the polar organic solvent is a mixture of from 1 to about 5 weight percent formamide in pyridine.

3. The method of claim 1 wherein the polar organic solvent is N,N-dimethylformamide.

4. The method of claim 1 wherein the polar organic solvent is N-methylpyrrolidone.

5. The method of claim 1 wherein a mixture of polar organic solvent containing dimethylsulfoxide is used.

6. The method for producing exo-3,4,5-trithiatricyclo-[5.2.1.0$^{2,6}$]decane as claimed in claim 1 wherein said norbornene compound reacted with sulfur is bicyclo-[2.2.1]hept-2-ene.

7. The method for producing 8-vinyl-exo-3,4,5-trithiatricyclo[5.2.1.0$^{2,6}$]decane as claimed in claim 1 wherein norbornene compound reacted with sulfur is 5-vinylbicyclo[2.2.1]hept-2-ene.

8. The method for producing 8-ethylidene-exo-3,4,5-trithiatricyclo[5.2.1.0$^{2,6}$]decane as claimed in claim 1 wherein said norbornene compound reacted with sulfur is 5-ethylidenebicyclo[2.2.1]hept-2-ene.

9. The method for producing 8-methyl-exo-3,4,5-trithiatricyclo[5.2.1.0$^{2,6}$]decane as claimed in claim 1 wherein said norbornene compound reacted with sulfur is 5-methylbicyclo[2.2.1]hept-2-ene.

10. The method for producing exo-3,4,5-trithiatetracyclo[5.5.1.0$^{2,6}$.0$^{8,12}$]tridec-9-ene as claimed in claim 1 wherein said norbornene compound reacted with sulfur is endo-dicyclopentadiene.

11. The method for producing 8-chloro-exo-3,4,5-trithiatricyclo[5.2.1.0$^{2,6}$]decane as claimed in claim 1 wherein said norbornene compound reacted with sulfur is 5-chlorobicyclo[2.2.1]hept-2-ene.

12. The method for producing 8-hydroxy-exo-3,4,5-trithiatricyclo[5.2.1.0$^{2,6}$]decane as claimed in claim 1 wherein said norbornene compound reacted with sulfur is 5-hydroxybicyclo[2.2.1]hept-2-ene.

13. The method for producing exo-3,4,5-trithiatricyclo[5.2.1.0$^{2,6}$]decane-8-methanol as claimed in claim 1 wherein said norbornene compound reacted with sulfur is bicyclo[2.2.1]hept-5-en-2-methanol.

14. 3,4,5-trithiapolycyclo compounds of the formula:

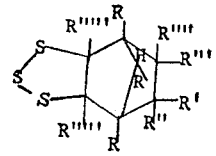

wherein each of R, R′, R″, R‴, and R″″ when taken singly is hydrogen, halogen, alkyl of from 1 to about 15 carbon atoms, aryl of from 6 to about 15 carbon atoms, and cycloalkyl of from 4 to about 10 carbon atoms; R′ and R‴ when taken singly can further be alkenyl of from 2 to about 10 carbon atoms, hydroxyl, hydroxyalkyl having from 1 to about 10 carbon atoms, haloalkyl having from 1 to about 10 carbon atoms, dialkylamino having from 1 to about 10 carbon atoms, dialkylaminoalkyl wherein the alkyl groups have from 1 to about 4 carbon atoms, and alkoxy having from 1 to about 10 carbon atoms; R″″″ is hydrogen and alkyl of from 1 to about 15 carbon atoms; R′ and R″ taken together are alkylidene of from 1 to about 6 carbon atoms; R′ and R‴ taken together are the divalent —CHYCH=CY— group; and Y is hydrogen or methyl.

15. Exo - 3,4,5 - trithiatricyclo[5.2.1.0$^{2,6}$]decane as claimed in claim 14.

16. 8 - vinyl - exo - 3,4,5-trithiatricyclo[5.2.1.0$^{2,6}$]decane as claimed in claim 14.

17. 8-ethylidene-exo - 3,4,5 - trithiatricyclo[5,2.1.0$^{2,6}$]decane as claimed in claim 14.

18. 8 - methyl - exo - 3,4,5-trithiatricyclo[5.2.1.0$^{2,6}$]decane as claimed in claim 14.

19. Exo - 3,4,5 -trithiatetracyclo[5.5.1.0$^{2,6}$.0$^{8,12}$]tridec-9-ene as claimed in claim 14.

20. 8 - chloro-exo - 3,4,5 - trithiatricyclo[5.2.1.0$^{2,6}$]decane as claimed in claim 14.

21. 8 - hydroxy - exo - 3,4,5-trithiatricyclo[5.2.1.0$^{2,6}$]decane as claimed in claim 14.

22. Exo - 3,4,5 - trithiatricyclo[5.2.1.0$^{2,6}$]decan - 8-methanol as claimed in claim 14.

References Cited

Bull. soc. chim., France, 1959, 1602.

HENRY R. JILES, Primary Examiner

C. M. SHURKO, Assistant Examiner

U.S. Cl. X.R.

252—401, 402, 406; 260—79, 79.7, 488, 563, 609, 656, 784; 106—287